Nov. 1, 1949    S. B. OSTERLUND ET AL    2,486,972
ELECTRIC MEASURING DEVICE

Filed Dec. 24, 1946    2 Sheets-Sheet 1

INVENTORS.
SOREN B. OSTERLUND
CARL GEISER
BY
Robert S. Dunham
ATTORNEY

Nov. 1, 1949    S. B. OSTERLUND ET AL    2,486,972
ELECTRIC MEASURING DEVICE
Filed Dec. 24, 1946    2 Sheets-Sheet 2

INVENTORS.
SOREN B. OSTERLUND
CARL GEISER
BY
Robert S. Dunham
ATTORNEY

Patented Nov. 1, 1949

2,486,972

UNITED STATES PATENT OFFICE 2,486,972

ELECTRIC MEASURING DEVICE

Soren B. Osterlund, St. Albans, and Carl Geiser, New York, N. Y., assignors to The Liquidometer Corporation, Long Island City, N. Y., a corporation of Delaware Application December 24, 1946, Serial No. 718,144

3 Claims. (Cl. 171—95)

This invention relates to electrical measuring devices, particularly to indicating and/or control devices in which the position of a rotor is controlled by deflecting coils which are differentially energized corresponding to a change of a variable physical magnitude to be supervised.

One object of the invention is to provide a novel and improved measuring device of the general type above referred to, which is reliable in operation, accurate in performance and provides conveniently and readily a desired distribution of the scale calibration.

Another object of the invention is to provide a measuring device of the general type, above referred to, which is relatively insensitive to adjacent magnetic fields tending to produce a torque or compass effect upon the rotor, thereby affecting the rotor position and causing an error in the indicating or control action of the device.

Another object of the invention is to provide a novel and improved measuring device of the general type above referred to, which develops a comparatively high torque, thereby increasing the accuracy of the performance of the instrument.

Another object of the invention is to provide a novel and improved measuring device which develops a torque higher than the torque of a conventional device of the same general type and comparable size.

Another object of the invention is to provide a measuring device which is practically free of magnetic hysteresis, thereby eliminating for all practical purposes all errors caused by hysteresis.

Another object of the invention is the provision of means preventing any appreciable part of the total magnetic flux to pass or leak out, thereby avoiding interference with adjacent instruments susceptible to magnetic fields.

Another object of the invention is the provision of means permitting a wide angular movement of the rotor, such as 360° or more, thereby providing a wide control and indicating range of the device and allowing the use of an extended indicating scale.

Another object of the invention is to provide a measuring device of the general type above referred to, in which the necessity of electrical connections between the rotor and a source of current is eliminated, thereby making possible the above mentioned wide angular movement of the rotor and greatly simplifying the manufacture and assembly of the device.

Another and further objects, features and advantages of the invention will appear hereinafter and in the appended claims forming part of the application.

In the accompanying drawings several now preferred embodiments of the invention are shown by way of illustration and not by way of limitation.

Figure 1:
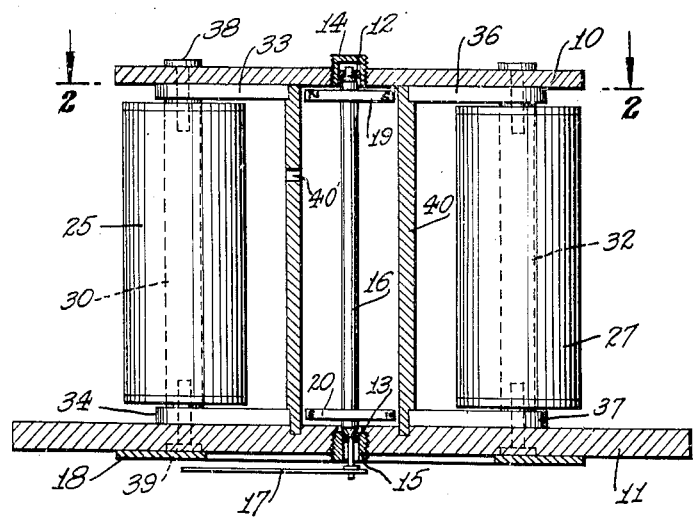
Figure 1 is a sectional side view of a measuring device according to the invention, along line 1—1 of Fig. 2.
Figure 2:
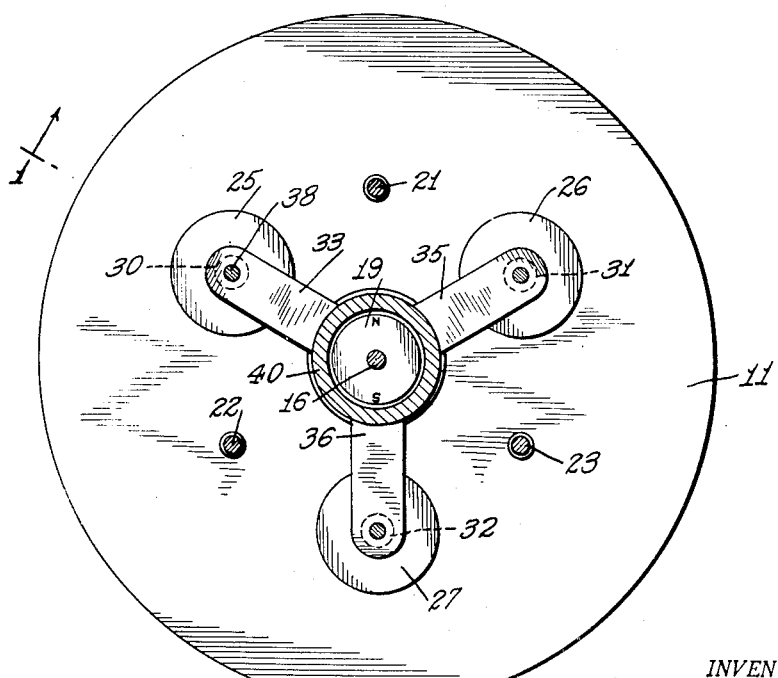
Fig. 2 is a sectional plan view along line 2—2 of Fig. 1.

Referring now specifically to Figs. 1 and 2, the illustrated embodiment of the invention shows a measuring device according to the invention, as may be used to indicate changes of a variable physical magnitude, such as the level of contents of a liquid contained in a container, for instance, in a fuel tank. The measuring device, as shown, comprises end plates 10 and 11 on which are mounted suitable bearings such as ring type jewel bearings 12 and 13 mounted by means of hollow screws 14 and 15. The bearings support an arbor 16 made of preferably non-magnetic material and carrying a pointer 17 which cooperates with a stationary dial 18 to indicate rotation of the arbor by readings on a scale marked on the dial. Also mounted on arbor 16 and rotatable therewith are permanent magnets 19 and 20 which may be cylindrical discs, each magnetized across a diameter. The magnet discs are preferably so positioned that their magnetic axes are parallel and their polarities reversed, with the north pole of one on the same side of the arbor 16 as the south pole of the other. It should be understood however, that the magnet discs do not necessarily have concentrated poles and that the letters N and S do not represent the actual pole locations. The distribution of flux throughout the magnet discs, and the location of the areas from which the flux leaves or enters the magnet discs, are controlled by the magnet charging device employed. In practice, it has been found advantageous to magnetize the discs in such a manner that the pole concentrations are located close to the disc perimeters.

End plates 10 and 11 are held together and in position by posts 21, 22 and 23 (see Fig. 2), extending between the end plates and fastened thereto by any suitable means, such as screws. It will be obvious that instead of three posts, as indicated in Fig. 2, any other suitable number of posts may be provided.

Three stationary deflecting coils 25, 26 and 27 are distributed at uniform intervals about the rotor assembly constituted by arbor 16 and discs 19 and 20, and positioned concentrically with the axis of the arbor. It is, of course, also possible to provide either two coils only or more than three coils.

Each coil is wound upon a core 30, 31 and 32 respectively made of a suitable magnetic material. The cores are extended beyond the top and bottom of the respective coils and support at each end pole shoes, more specifically core 30 supports pole shoes 33 and 34, core 31, pole shoes 35 (the second pole shoe on core 31 not being shown on the drawings) and core 32, pole shoes 36 and 37.

The coil assemblies are mounted between the end plates by any suitable means such as screws 38 and 39 threaded through the end plates.

The individual pole shoes may have any suitable shape. The configuration of the pole shoes, as shown on Fig. 2, has been found to give particularly advantageous results. As can best be seen on Fig. 2, the pole shoes have arcuate ends corresponding to the diameters of and concentric with magnet discs 19 and 20. They may extend closely adjacent to the magnet discs, but it has been found preferable in many cases to provide a sleeve 40 made of non-magnetic metal, such as copper, between the magnet discs and the pole faces. This sleeve which is provided with a breathing hole 40' serves as a shield to provide adequate eddy-current damping of the rotor assembly, and also to protect the delicate bearings of the rotor against the intrusion of dust. Sleeve 40 may be fastened to the end plates by fitting it into grooves provided therein. The coil terminals or wires leading off from deflecting coils 25, 26 and 27 are not shown on Figs. 1 and 2, but it should be understood that each coil consists of one or more windings of insulated copper wire and that connections to an external circuit are provided for each coil.

Figure 5:
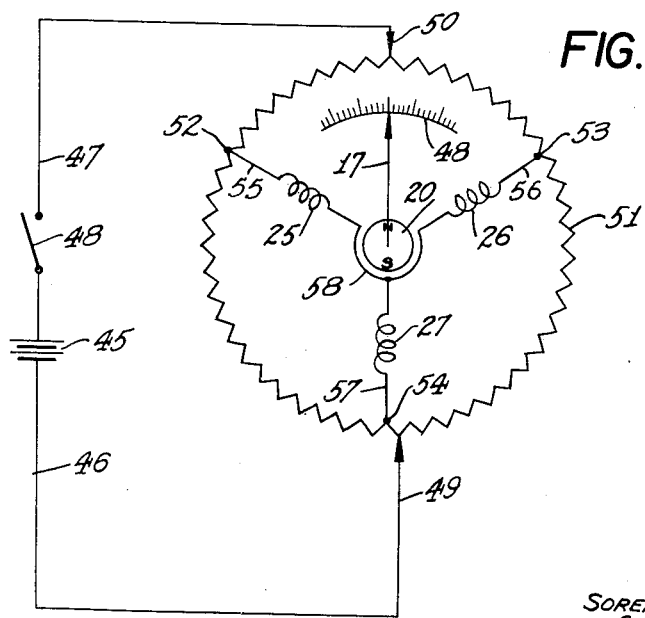
Fig. 5 is a typical diagram for operating a measuring device according to the invention.

The circuit diagram according to Fig. 5 illustrates diagrammatically a circuit system for controlling the energizing currents in coils 25, 26 and 27 of the device as shown on Figs. 1 and 2 for the purpose of controlling the position of the rotor assembly, for example, in response to a change of the level of gasoline in a tank. The device may then form part of a so-called liquid level gauge operating by means of a float floating on the liquid.

The circuit system comprises a battery 45 connected by wires 46 and 47 and a switch 48 to slidable brushes 49 and 50 respectively, which slide upon and are in electric contact with a ring type resistor 51. This resistor together with the slider contacts may constitute the transmitter unit of the liquid level gauge, whereas the device as shown on Figs. 1 and 2 constitutes the receiver unit of the gauge. Resistor 51 has taps 52, 53 and 54, each connecting the ring resistor to one of the terminals of coils 25, 26, 27 respectively by wires 55, 56 and 57, the other terminals of the three coils being connected by a common wire 58. It should, of course, be understood that the transmitter arrangement as shown in Fig. 5, is only diagrammatic and does not and is not intended to illustrate the actual structure.

If sliders 49 and 50 be moved along the ring resistor 51, then the currents flowing through the coils (assuming switch 48 be closed) will change relatively to each other with a corresponding change in the resulting magnetic field. As a result, the rotor assembly mounted on arbor 16 will rotate into a new position as determined by the changed magnetic field. The new rotor position, which corresponds to the new value of the variable physical magnitude to be supervised, will then be indicated by pointer 17 on scale 18.

As will be apparent from the previous description and the drawings, a low reluctance path is provided for the magnetic flux interrupted only by short air gaps. As may be seen in Fig. 1, the flux from magnet disc 19 may pass through a small air gap, pole shoe 33, core 30, pole shoe 34, a small air gap, magnet disc 20, a small air gap, pole shoe 37, core 32, pole shoe 36, and a small air gap back to magnet disc 19. As a result, practically the entire magnetic flux will flow through the previously described magnetic path, and only a very small portion of the magnetic flux can escape as stray flux. Consequently, any appreciable interference with adjacent instruments sensitive to magnetic fields is avoided. It will be evident that the magnetic flux will pass through varying pairs of coil assemblies depending on the differential energization of the coils and the position of the rotor assembly relative to the coils.

It will further be apparent that the reluctance of the magnetic path, as long as the total length of the air gaps remains unchanged will not change appreciably, when the lengths of the coil cores or the coil pole shoes are varied. By extending the length of either or both of the coil cores and coil pole shoes, the number of turns in the coils can be greatly increased, with a corresponding increase in torque. Extensive tests have shown that devices designed according to the invention can be made with a torque many times greater than that obtainable with similar devices without magnetic cores and pole shoes, according to the invention.

It will further be apparent that no electric connections between the rotor assembly and any stationary parts are required. As a result, the scale length is not limited but can extend through 360° or more.

Figure 3:
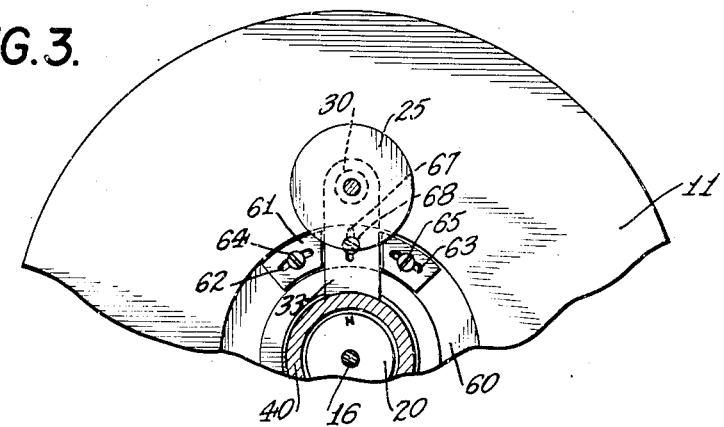
Fig. 3 is a fragmentary view of a measuring device according to the invention, showing a modification of the device.
Figure 4:
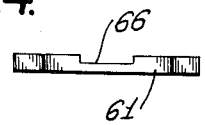
Fig. 4 is a side view of a detail of the modification according to Fig. 3.

Under certain circumstances it is desirable to adjust the positions of the coil assemblies relative to each other and to the rotor assembly, for instance for purpose of adjusting the scale calibration or to neutralize irregularities of the coil windings which are practically unavoidable in the mass production of coils. To facilitate such adjustment of the coil assemblies, an annular groove 60 is provided in the lower side of end plate 10 and the top side of plate 11 (Fig. 3). Each of these grooves guides a correspondingly curved slide 61. These slides are provided with one or more arcuate slots 62 and 63 through which screws 64 and 65 are threaded into corresponding threaded holes of the plate. As will be apparent, loosening and tightening of these screws will permit a circumferential displacement of a coil assembly. To permit a radial adjustment of a coil assembly, each slide is provided with a radially extending slot 66 (Fig. 4) in which the respective pole shoes are guided. Each pole shoe has radial slot 67 through which a screw 68 is threaded into a slide 61. These screws serve to secure the coil assemblies to the slides and also permits adjustment of the coil assemblies radially.

While the invention has been described in detail with respect to certain preferred examples and embodiments it will be understood by those skilled in the art after understanding the invention that various changes and modifications may be made without departing from the spirit and scope of the invention, and it is intended therefore, in the appended claims, to cover all such changes and modifications.

What is claimed is:

1. An electrical measuring instrument of the ratiometer type, comprising a rotor assembly including an arbor and two magnetic members mounted thereon in axially spaced relation, at least one of said members being permanently magnetized in a direction transverse of the axis of said arbor, a plurality of stationary deflecting coils disposed at substantially uniform distances from said rotor assembly with the axes of said coils substantially parallel with the axis of said arbor, said rotor assembly including said members having an outside diameter less than the radial distance from the axis of said arbor to the nearest part of any of said coils, a magnetic core for each of said coils, and pole pieces of magnetic material in contact with each end of each said core and extending therefrom substantially radially inwardly toward the axis of said arbor, said members being located on said arbor in substantially radial alignment with said pole pieces, whereby to form magnetic circuits closed substantially through said magnetic members, said pole pieces and said cores.

2. An electrical measuring instrument of the ratiometer type, comprising a rotor assembly including an arbor and two magnetic members mounted thereon in axially spaced relation, said members being permanently magnetized in a direction transverse of the axis of said arbor and having their polarities respectively in opposite directions, a plurality of stationary deflecting coils disposed at substantially uniform distances from said rotor assembly with the axes of said coils substantially parallel with the axis of said arbor, said rotor assembly including said members having an outside diameter less than the radial distance from the axis of said arbor to the nearest part of any of said coils, a magnetic core for each of said coils, and pole pieces of magnetic material in contact with each end of each said core and extending therefrom substantially radially inwardly toward the axis of said arbor, each of said members and said pole pieces on one end of each of said coils lying substantially in a single plane transverse to the axis of said arbor, the length of said coils being substantially equal to the axial distance between said members along said arbor, said pole pieces having reentrant end portions at their radially inner ends substantially concentric with said members and the axis of said arbor and having said reentrant end portions closely adjacent to said members, whereby to form magnetic circuits closed substantially through said magnetic members, said pole pieces and said cores.

3. An electrical measuring instrument of the ratiometer type, comprising a rotor assembly including an arbor and two magnetic members mounted thereon in axially spaced relation, at least one of said members being permanently magnetized in a direction transverse of the axis of said arbor, a plurality of stationary deflecting coils disposed at substantially uniform distances from said rotor assembly with the axes of said coils substantially parallel with the axis of said arbor, said rotor assembly including said members having an outside diameter less than the radial distance from the axis of said arbor to the nearest part of any of said coils, a magnetic core for each of said coils, pole pieces of magnetic material in contact with each end of each said core and extending therefrom substantially radially inwardly toward the axis of said arbor, said members being located on said arbor in substantially radial alignment with said pole pieces, and a damping shield of non-magnetizable, electrically conducting material entirely surrounding said rotor and the members carried thereby and disposed inside said coils and said pole pieces, whereby to form magnetic circuits closed substantially through said magnetic members, said pole pieces and said cores.

SOREN B. OSTERLUND.
CARL GEISER.

REFERENCES CITED

The following references are of record in the file of this patent:

UNITED STATES PATENTS

| Number | Name | Date |
| --- | --- | --- |
| 2,372,002 | Kelly | Mar. 20, 1945 |
| 2,450,331 | De Giers et al. | Sept. 28, 1948 |